United States Patent
Ihor et al.

(10) Patent No.: US 12,135,703 B2
(45) Date of Patent: Nov. 5, 2024

(54) METHOD AND APPARATUS FOR OPERATING ACCELERATOR USING SOFTMAX APPROXIMATION

(71) Applicant: Samsung Electronics Co., Ltd., Suwon-si (KR)

(72) Inventors: Vasyltsov Ihor, Suwon-si (KR); Wooseok Chang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 122 days.

(21) Appl. No.: 17/204,168

(22) Filed: Mar. 17, 2021

(65) Prior Publication Data

US 2021/0294784 A1 Sep. 23, 2021

Related U.S. Application Data

(60) Provisional application No. 62/990,509, filed on Mar. 17, 2020.

(30) Foreign Application Priority Data

Sep. 7, 2020 (KR) .................... 10-2020-0114066

(51) Int. Cl.
 *G06F 16/22* (2019.01)
 *G06F 16/2455* (2019.01)
(52) U.S. Cl.
 CPC ...... *G06F 16/2272* (2019.01); *G06F 16/2455* (2019.01)
(58) Field of Classification Search
 None
 See application file for complete search history.

(56) References Cited

U.S. PATENT DOCUMENTS

| | | |
|---|---|---|
| 10,032,067 B2 | 7/2018 | El-Khamy et al. |
| 2006/0112042 A1 | 5/2006 | Platt et al. |
| 2016/0350646 A1 | 12/2016 | Leeman-Munk et al. |
| 2016/0379115 A1 | 12/2016 | Burger et al. |
| 2017/0103311 A1 | 4/2017 | Henry et al. |
| 2017/0103320 A1 | 4/2017 | Henry et al. |
| 2017/0223334 A1 | 8/2017 | Nobayashi |
| 2018/0137647 A1 | 5/2018 | Li et al. |
| 2018/0158189 A1 | 6/2018 | Yedla et al. |
| 2018/0260379 A1 | 9/2018 | Yu et al. |

(Continued)

FOREIGN PATENT DOCUMENTS

| | | |
|---|---|---|
| CN | 110046643 A | 7/2019 |
| KR | 10-2021-0045287 A | 4/2021 |

OTHER PUBLICATIONS

Du, Efficient Softmax Hardware Architecture for Deep Neural Networks, May 2019, pp. 75-80 (Year: 2019).*

(Continued)

*Primary Examiner* — Christopher J Raab
(74) *Attorney, Agent, or Firm* — NSIP Law

(57) ABSTRACT

A method of operating a hardware accelerator, includes loading a lookup table, mapping each of input data values of input data to an index of indexes in the lookup table based on an input data distribution of the input data, and obtaining output data values corresponding to the input data values using the lookup table. The output data values are proportional to corresponding softmax values of the input data values.

32 Claims, 9 Drawing Sheets

(56) References Cited

U.S. PATENT DOCUMENTS

| | | | |
|---|---|---|---|
| 2018/0307897 A1 | 10/2018 | El-Khamy et al. | |
| 2018/0336465 A1 | 11/2018 | Kim et al. | |
| 2019/0073583 A1 | 3/2019 | Chen et al. | |
| 2019/0114555 A1* | 4/2019 | Akerib | G06F 17/18 |
| 2019/0122654 A1 | 4/2019 | Song et al. | |
| 2019/0156817 A1 | 5/2019 | Li et al. | |
| 2019/0325309 A1* | 10/2019 | Flamant | G06N 3/045 |
| 2020/0104686 A1* | 4/2020 | Li | G06N 3/084 |
| 2020/0117991 A1* | 4/2020 | Suzuki | G06N 3/045 |
| 2020/0225913 A1* | 7/2020 | Chen | G06F 7/544 |
| 2021/0166139 A1* | 6/2021 | Fujimura | G06N 7/01 |
| 2022/0230713 A1* | 7/2022 | Maragakis | G06N 3/0454 |
| 2022/0292362 A1* | 9/2022 | Mishina | G06N 3/048 |

OTHER PUBLICATIONS

Xilinx "Using Look-Up Tables as Shift Registers (SRLUTs)" www.xilinx.com *UG002 (v1.3) Virtex-II Platform FPGA Handbook Dec. 3, 2001* (10 pages in English).

Dong, et al. "Hardware Implementation of Softmax Function Based on Piecewise LUT." *IEEE International Workshop on Future Computing IWOFC.*, 2019.

Extended European Search Report issued on Aug. 4, 2021 in counterpart European Patent Application No. 21160992.0 (16 pages in English).

Ling, Wang, et al. "Character-based neural machine translation." *ICLR conference paper* (Nov. 14, 2015). (11 pages in English).

Tan, Zichang, et al. "Age estimation based on a single network with soft softmax of aging modeling." *Asian Conference on Computer Vision.* Springer, Cham, 2016. (15 pages in English).

Yuan, Bo. "Efficient hardware architecture of softmax layer in deep neural network." *2016 29th IEEE International System-on-Chip Conference (SOCC).* IEEE, 2016. (4 pages in English).

Li, Zhenmin, et al. "Efficient FPGA implementation of softmax function for DNN applications." *2018 12th IEEE International Conference on Anti-counterfeiting, Security, and Identification (ASID).* IEEE, 2018.(5 pages in English).

Geng, Xue, et al. "Hardware-aware softmax approximation for deep neural networks." *Asian Conference on Computer Vision.* Springer, Cham, 2018. (16 pages in English).

Wang, Meiqi, et al. "A high-speed and low-complexity architecture for softmax function in deep learning." *2018 IEEE Asia Pacific Conference on Circuits and Systems (APCCAS).* IEEE, 2018. (4 pages in English).

Hu, Ruofei, et al. "Efficient hardware architecture of softmax layer in deep neural network." 2018 IEEE 23rd International Conference on Digital Signal Processing (DSP). IEEE, 2018. (5 pages in English).

Sun, Qiwei, et al. "A high speed softmax VLSI architecture based on basic-split." *2018 14th IEEE International Conference on Solid-State and Integrated Circuit Technology (ICSICT).* IEEE, 2018. (3 pages in English).

Gu, Jiatao, Daniel Jiwoong Im, and Victor Ok Li. "Neural machine translation with gumbel-greedy decoding." *Proceedings of the AAAI Conference on Artificial Intelligence.* vol. 32. No. 1. 2018. (10 pages in English).

Wang, Kai-Yen, et al. "A Customized Convolutional Neural Network Design Using Improved Softmax Layer for Real-time Human Emotion Recognition." *2019 IEEE International Conference on Artificial Intelligence Circuits and Systems (AICAS).* IEEE, 2019. (5 pages in English).

Kouretas, Ioannis, and Vassilis Paliouras. "Simplified hardware implementation of the softmax activation function." *2019 8th International Conference on Modern Circuits and Systems Technologies (MOCAST).* IEEE, 2019. (4 pages in English).

\* cited by examiner

METHOD AND APPARATUS FOR OPERATING ACCELERATOR USING SOFTMAX APPROXIMATION

CROSS-REFERENCE TO RELATED APPLICATIONS

This application claims the benefit under 35 U.S.C. § 119(e) of U.S. Provisional Application No. 62/990,509 filed on Mar. 17, 2020, in the U.S. Patent and Trademark Office, and claims the benefit under 35 U.S.C. § 119(a) of Korean Patent Application No. 10-2020-0114066 filed on Sep. 7, 2020, in the Korean Intellectual Property Office, the entire disclosures of which are incorporated herein by reference for all purposes.

BACKGROUND

1. Field

The following description relates to a method and apparatus with softmax approximation.

2. Description of Related Art

A neural network may be implemented based on a computational architecture. A neural network processing device may require a great computational amount to compute complex input data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating a hardware accelerator, includes loading a lookup table, mapping each of input data values of input data to an index of indexes in the lookup table based on an input data distribution of the input data, and obtaining output data values corresponding to the input data values using the lookup table. The output data values are proportional to corresponding softmax values of the input data values.

The method may further include calculating differences between a maximum input data value of the input data and each of the input data values.

The mapping may include directly mapping the differences to the indexes.

The mapping may include scaling the differences and mapping the scaled differences to the indexes.

The lookup table may store therein information associated with a reciprocal of an exponential function corresponding to the indexes.

The information associated with the reciprocal of the exponential function may include information associated with an integer corresponding to the reciprocal of the exponential function based on a number of bits for quantization of the output data values.

The lookup table may include a plurality of lookup tables. The loading may include determining an index range based on a greatest difference of differences obtained through the calculating, and loading one of the lookup tables based on the determined index range.

The loading may include determining an index range based on a greatest difference of differences obtained through the calculating, and loading the lookup table generated in real time based on the determined index range.

The obtaining of the output data values may include mapping a clock of a shift register to the indexes, and obtaining the output data values using the shift register.

The method may further include loading a compensation coefficient lookup table, calculating a sum of the output data values corresponding to the input data values, mapping the sum of the output data values to indexes in the compensation coefficient lookup table, obtaining compensation coefficients corresponding to the input data values using the compensation coefficient lookup table, and obtaining normalized output data values corresponding to the input data values based on the compensation coefficient.

A non-transitory computer-readable storage medium may store instructions that, when executed by one or more processors, configure the one or more processors to perform the method.

In another general aspect, a hardware accelerator includes one or more processors configured to load a lookup table, map each of input data values to an index of indexes in the lookup table based on an input data distribution of the input data, and obtain output data values corresponding to the input data values using the lookup table. The output data values are proportional to corresponding softmax values of the input data values.

The one or more processors may be configured to calculate differences between a maximum input data value of the input data and each of the input data values.

The one or more processors may be configured to directly map the differences to the indexes.

The one or more processors may be configured to scale the differences and map the scaled differences to the indexes.

The lookup table may store therein information associated with a reciprocal of an exponential function corresponding to the indexes.

The information associated with the reciprocal of the exponential function may include information associated with an integer corresponding to the reciprocal of the exponential function based on a number of bits for quantization of the output data values.

The lookup table may include a plurality of lookup tables. The one or more processors may be configured to determine an index range based on a greatest difference of differences obtained through the calculating, and load one of the lookup tables based on the determined index range.

The one or more processors may be configured to determine an index range based on a greatest difference of differences obtained through the calculating, and load the lookup table generated in real time based on the determined index range.

The one or more processors may be configured to map a clock of a shift register to the indexes, and obtain the output data values using the shift register.

The one or more processors may be configured to load a compensation coefficient lookup table, calculate a sum of the output data values corresponding to the input data values, map the sum of the output data values to indexes in the compensation coefficient lookup table, obtain compensation coefficients corresponding to the input data values using the compensation coefficient lookup table, and obtain normalized output data values corresponding to the input data values based on the compensation coefficient.

In another general aspect, a neural network device includes a central processing unit (CPU) configured to generate a lookup table in which information associated with a reciprocal of an exponential function is stored, and a neural processing unit (NPU) configured to load the lookup table and obtain output data values corresponding to input data values. The output data values are proportional to corresponding softmax values of the input data values.

The NPU may be a hardware accelerator.

The CPU may be further configured to generate a neural network for classification of the input data values.

The output data values may be obtained as a result of computing a probability of which class the input data values correspond.

The neural network for classification may include a loss layer configured to compute a loss as an objective function for learning.

The NPU may be is further configured to scale differences between a maximum input data value of the input data values and each of the input data values, and map the scaled differences to indexes of the lookup table.

Other features and aspects will be apparent from the following detailed description, the drawings, and the claims.

Figure 1:
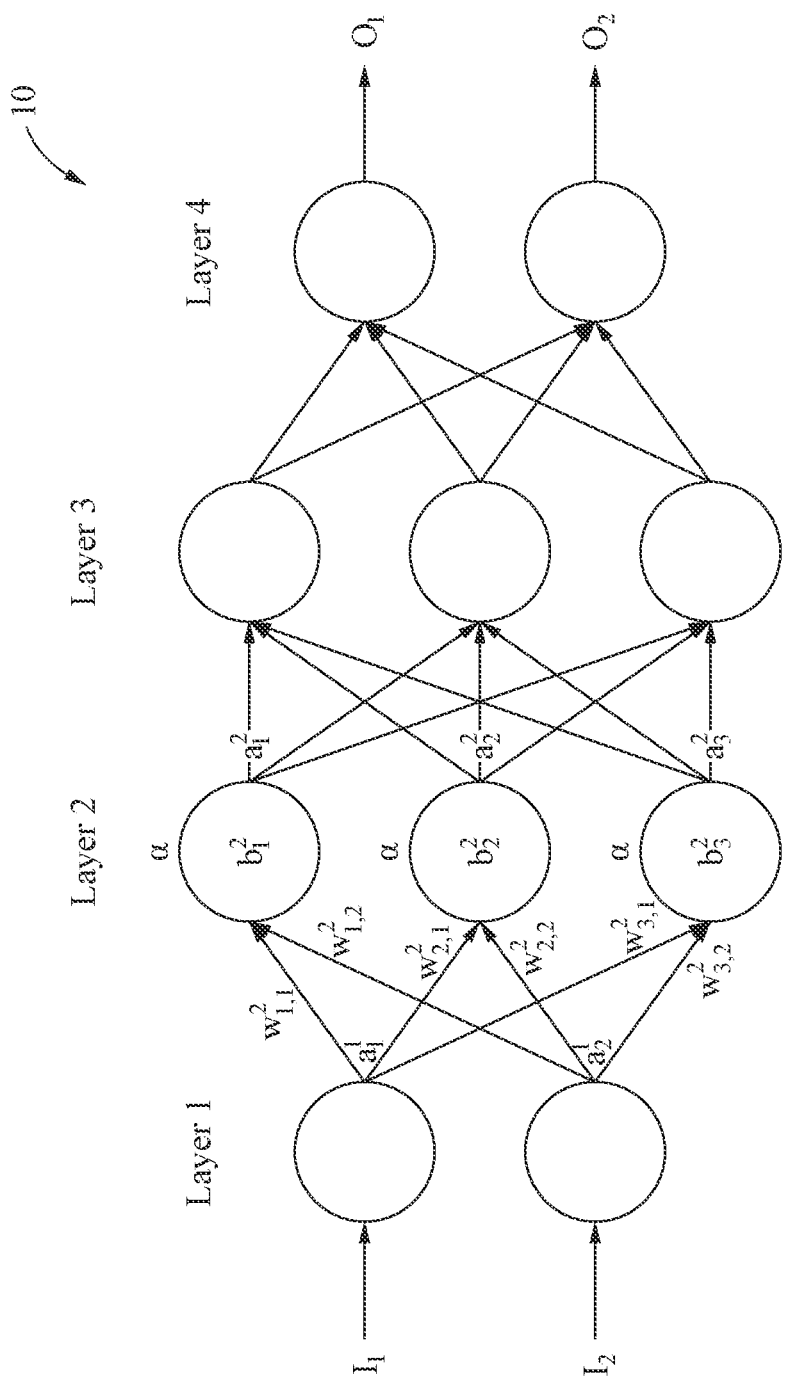
FIG. 1 illustrates an example of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

The following example embodiments may be embodied in various forms of products, for example, a personal computer (PC), a laptop computer, a tablet PC, a smartphone, a television (TV), a smart home appliance, an intelligent vehicle, a kiosk, and a wearable device. Hereinafter, the example embodiments will be described in detail with reference to the accompanying drawings, and like reference numerals in the drawings refer to like elements throughout.

There is a desire for a method of effectively processing computations or operations involved with a neural network to analyze massive input data in real time using the neural network and extract desired information.

FIG. 1 illustrates an example of a neural network.

In the example of FIG. 1, illustrated is a neural network 10. The neural network 10 may have an architecture that includes an input layer, hidden layers, and an output layer, and may be configured to perform computation or operation based on received input data (e.g., $I_1$ and $I_2$) and generate output data (e.g., $O_1$ and $O_2$) based on a result of performing the computation. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The neural network 10 may be a deep neural network (DNN) including one or more hidden layers, or n-layer neural networks. For example, as illustrated in FIG. 1, the neural network 10 may be a DNN including an input layer (Layer 1), two hidden layers (Layer 2 and Layer 3), and an output layer (Layer 4). The DNN may include, for example, a convolutional neural network (CNN), a recurrent neural network (RNN), a deep belief network (DBN), and a restricted Boltzman machine (RBM), but examples are not limited thereto.

In an example in which the neural network 10 is of such a DNN architecture, the neural network 10 may include a greater number of layers that extract available information, and thus process more complex data sets compared to an existing neural network. Although the neural network 10 is illustrated in FIG. 1 as including four layers, examples are not limited thereto and the neural network 10 may include a number of layers less than or greater than the illustrated four layers. Also, the neural network 10 may include layers of various architectures different from the illustrated architecture. For example, the neural network 10 may be a DNN including a convolution layer, a pooling layer, and a fully-connected (FC) layer.

Each of the layers included in the neural network 10 may include a plurality of artificial nodes each known by a term such as a "neuron," a "processing element (PE)," and a "unit." For example, as illustrated in FIG. 1, Layer 1 may include two nodes and Layer 2 may include three nodes. However, the number of nodes is provided merely as an example, and each of the layers included in the neural network 10 may include various numbers of nodes.

The nodes included in the layers included in the neural network 10 may be connected to one another to exchange data therebetween. For example, one node may receive data from other nodes to perform computation on the received data, and output a result of the computation to still other nodes.

An output value of each of the nodes may be referred to herein as an activation. The activation may be an output value of one node and an input value of nodes included in a subsequent layer. Each node may determine an activation of its own based on activations received from nodes included in a previous layer and weights. A weight may refer to a parameter used to calculate an activation at each node and be assigned to a connection relationship between nodes.

Each node may be a hardware computational unit that, for example, receives an input and outputs activations, and performs input-output mapping. For example, in a case in which $\sigma$ denotes an activation function, $w_{jk}^{i}$ denotes a weight from a kth node included in an i-1th layer to a jth node included in an ith layer, $b_j^i$ denotes a bias value of the jth node included in the ith layer, and $a_j^i$ denotes an activation of the jth node in the ith layer, the activation $a_j^i$ may be represented by Equation 1.

$$a_j^i = \sigma\left(\sum_k (w_{jk}^j \times a_k^{i-1}) + b_j^i\right) \quad \text{Equation 1}$$

For example, as illustrated in FIG. 1, an activation of a first node in a second layer (Layer 2) may be represented as $\alpha_1^2$. In this example, the activation may have a value represented by based on Equation 1 above. Equation 1 is provided merely as an example to describe an activation and a weight used to process data in a neural network, and thus examples are not limited thereto. For example, an activation may be a value obtained by applying, to a rectified linear unit (ReLU), a value obtained by applying an activation function to a weighted sum of activations received from a previous layer.

As described above, in a neural network, numerous data sets may be exchanged among a plurality of interconnected nodes, and undergo numerous computation processes while passing through layers. Thus, there is a desire for a method that may minimize accuracy loss while reducing the computational amount needed for processing complex input data.

Figure 2:
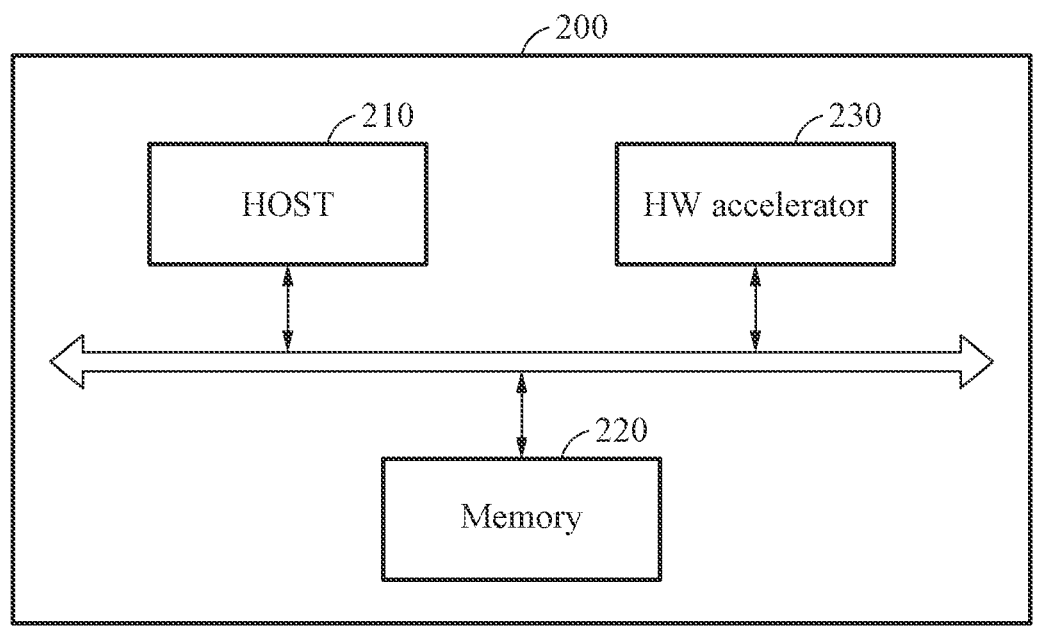
FIG. 2 illustrates an example of a hardware configuration of a neural network device.

FIG. 2 illustrates an example of a hardware configuration of a neural network device.

In FIG. 2, a neural network device 200 may include a host 210, a hardware accelerator 230, and a memory 220, as a non-limiting example.

The neural network device 200 may be a computing device having various processing functions, such as, for example, generating a neural network, training or learning a neural network, quantizing a floating-point type neural network to be a fixed-point type neural network, and retraining a neural network. For example, the neural network device 200 may be, or embodied by, various types of devices, for example, a PC, a remote server device, a mobile device, and the like.

The host 210 may perform an overall function to control the neural network device 200. For example, the host 210 may control the neural network device 200 overall by executing instructions stored in the memory 220 of the neural network device 200. The host 210 may be, or embodied by, for example, a central processing unit (CPU), a graphics processing unit (GPU), and an application processor (AP) that are included in the neural network device 200, but examples are not limited thereto.

The host 210 may generate a neural network for classification, and train the neural network for classification. The neural network for classification may output a computation result obtained by computing which class input data belongs to. For example, the neural network for classification may output, as a result value with respect to each class, a computation result obtained by computing a probability of input data corresponding to each class. The neural network for classification may include a softmax layer and a loss layer. The softmax layer may convert a result value with respect to each class to a probability value, and the loss layer may compute a loss as an objective function for training or learning.

The memory 220 may be hardware configured to store various sets of data, and may store sets of data processed or to be processed in the neural network device 200. In addition, the memory 220 may store applications, drivers, and the like to be executed or driven by the neural network device 200. The memory 220 may be a dynamic random-access memory (DRAM), but not limited thereto. The memory 220 may include at least one of a volatile memory or a nonvolatile memory.

The neural network device 200 may also include the hardware accelerator 230 to operate a neural network. The hardware accelerator 230 may be a module dedicated to operating the neural network and include, for example, a neural processing unit (NPU), a tensor processing unit (TPU), and a neural engine, but examples are not limited thereto.

Figure 3:
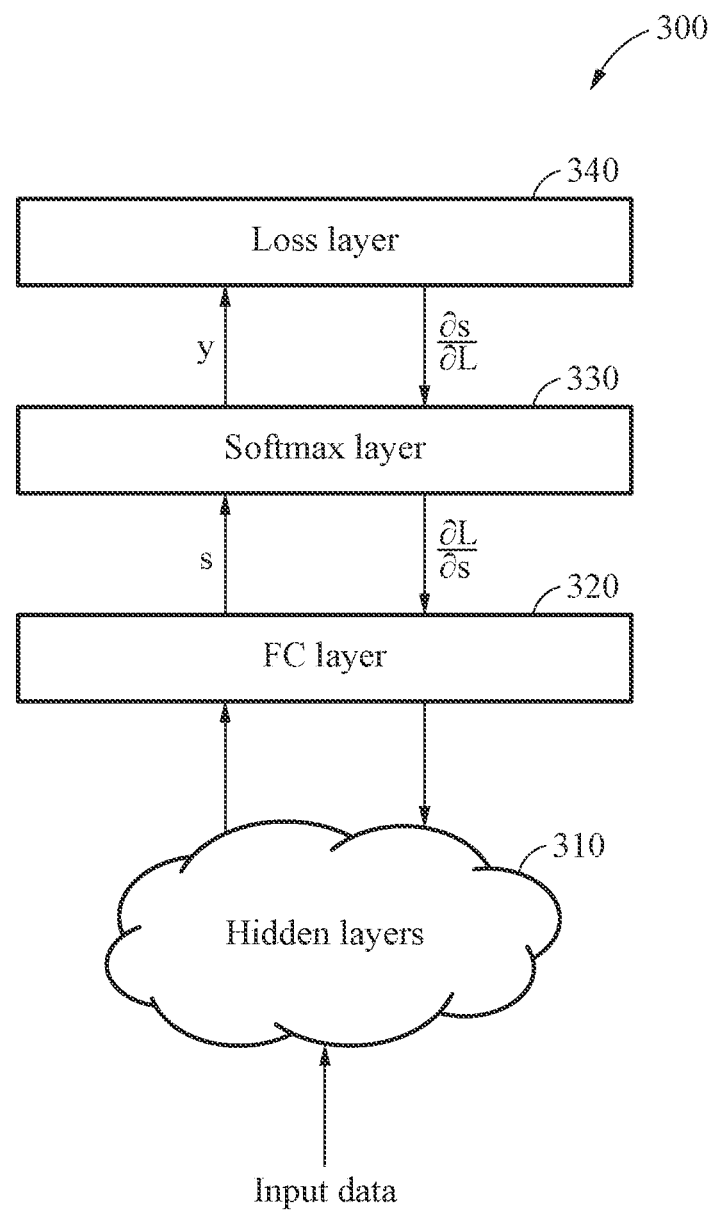
FIG. 3 illustrates an example of a neural network for classification.

FIG. 3 illustrates an example of a neural network for classification.

In FIG. 3, a neural network 300 for classification may include hidden layers 310, an FC layer 320, a softmax layer 330, and a loss layer 340. A portion of the hidden layers 310 may be an FC layer, and thus the FC layer 320 may be a last FC layer of the neural network 300. That is, the FC layer 320 may be an FC layer that comes last in order among FC layers of the neural network 300.

When input data is input to the neural network 300, sequential computation processes are performed through the hidden layers 310 and the FC layer 320, and then a computation result s corresponding to a probability of the input data being classified into each class may be output from the FC layer 320. That is, the FC layer 320 may output a result value corresponding to the probability of the input data being classified into a corresponding class as the computation result s with respect to each class. For example, the FC layer 320 may include nodes respectively corresponding to classes, and each of the nodes of the FC layer 320 may output a result value corresponding to a probability of the input data being classified into a corresponding class. For example, in a case in which a neural network is implemented for classification into five classes, an output value of each of first through fifth nodes of an FC layer of the neural network may be a result value indicating a probability of input data being classified into each of first through fifth classes.

The FC layer 320 may output the computation result s to the softmax layer 330, and the softmax layer 330 may convert the computation result s to a probability value y. That is, the softmax layer 330 may generate the probability value y by normalizing the result value corresponding to the probability of the input data being classified into each class. The softmax layer 330 may then output the probability value y to the loss layer 340, and the loss layer 340 may calculate a cross-entropy loss L of the computation result s based on the probability value y. That is, the loss layer 340 may calculate the cross-entropy loss L that indicates an error of the computation result s.

For example, the softmax layer 330 may convert the computation result s to the probability value y using a softmax operation as represented by Equation 2, and the loss layer 340 may calculate the cross-entropy loss L of the computation result s using Equation 3 represented below.

$$y_i = \frac{e^{s_i}}{\sum_{c=1}^{N_c} e^{s_c}}$$ Equation 2

$$L = -\sum_{c=1}^{N_c} t_i \log(y_i)$$ Equation 3

In Equations 2 and 3, si denotes an output value of an ith node of the FC layer 320, for example, a result value with respect to an ith class of classes. $y_i$ denotes an output value of an ith node of the softmax layer 330, for example, a probability value with respect to the ith class of the classes. $N_c$ denotes the number of the classes. $t_i$ may be a ground truth (GT) label for the ith class.

Subsequently, a backpropagation learning process may be performed. Through the loss layer 340, the softmax layer 330 may calculate a gradient of the cross-entropy loss L.

For example, the softmax layer 330 may calculate the gradient (e.g., $$\frac{\partial L}{\partial s_i}$$

) of the cross-entropy loss L using Equation 4 represented below.

$$\frac{\partial L}{\partial s_i} = \sum_{k=1}^{N_c} \frac{\partial L}{\partial y_k} \frac{\partial y_k}{\partial s_i} = y_i - t_i$$ Equation 4

In Equation 4, si denotes an output value of an ith node of the FC layer 320, for example, a result value with respect to an ith class of classes. $y_i$ denotes an output value of an ith node of the softmax layer 330, for example, a probability value with respect to the ith class of the classes. $N_c$ denotes the number of the classes. $t_i$ denotes a GT label for the ith class.

Subsequently, a learning process that is based on the gradient of the cross-entropy loss L may be performed in the FC layer 320. For example, a weight of the FC layer 320 may be updated according to a gradient descent algorithm. In addition, a successive learning process may be performed in the hidden layers 310.

Referring back to FIG. 2, the hardware accelerator 230 may perform a softmax operation. A typical hardware accelerator may not perform a complex softmax operation, but merely perform a matrix-vector multiplication. Thus, a typical neural network device may only perform the matrix-vector multiplication through the hardware accelerator, move a result of the multiplication to a host, perform a softmax operation in the host, and then move a result of the softmax operation back to the hardware accelerator. Such a typical method may make the development of software for data conversion and movement more complicated, which may adversely affect overall performance and power consumption.

For the softmax operation, a method by which the hardware accelerator performs the softmax operation has been proposed to prevent the intervention of the host; however, such method may require a divider, which may incur an additional hardware cost.

According to an example embodiment, the hardware accelerator 230 may perform the softmax operation without such a divider. The hardware accelerator 230 may convert input data to have a positive value while preventing an overflow, and read an appropriate value through a lookup table (LUT) by directly using a value obtained through the conversion as an index, thereby implementing and performing efficient softmax approximation.

The hardware accelerator 230 may estimate a softmax value through an approximation operation represented by Equation 5 below, instead of the softmax operation represented by Equation 2 above.

$$y = \frac{1}{e^{max(x)-x}}$$ Equation 5

In Equation 5, x denotes each input data value, and y denotes output data corresponding to each input data value. max(x) denotes a maximum input data value. Thus, max(x)-x denotes a difference between the maximum input data value and each input data value.

In Equation 2 above, a softmax value may be a probability value of an exponential function value of each input data value x. However, in Equation 5, output data may be an exponential function value of each converted input data. Thus, the output data y in Equation 5 may be proportional to a softmax value of each input data value x.

In Equation 5, the hardware accelerator 230 may convert input data to positive value data through inverse computation, for example, max(x)-x, not x-max(x), and perform a reciprocal version of conversion, for example, 1/exp(x), to compensate such inverse computation.

In addition, although to be described hereinafter, the hardware accelerator 230 may convert the input data to have a positive value while preventing an overflow, and map the value obtained through the converting to an index in a LUT. However, in an example of using the input data without such conversion, a range of the input data may not be defined, and thus it may not be easy to construct a LUT corresponding to the input data. In addition, in an example of converting the input data to negative value data through forward computation, for example, x-max(x), additional conversions or transformations (e.g., scaling and/or biasing) may be required for the mapping of an index in the LUT, and an overload may occur accordingly.

According to an example embodiment, by calculating a softmax value using only a 1D LUT, it may be possible to reduce the size of the LUT, greatly reduce computational complexity without a need for a divider and/or a multiplier, and implement it in the hardware accelerator 230 such as an NPU without a requirement for a large hardware resource.

Figure 4:
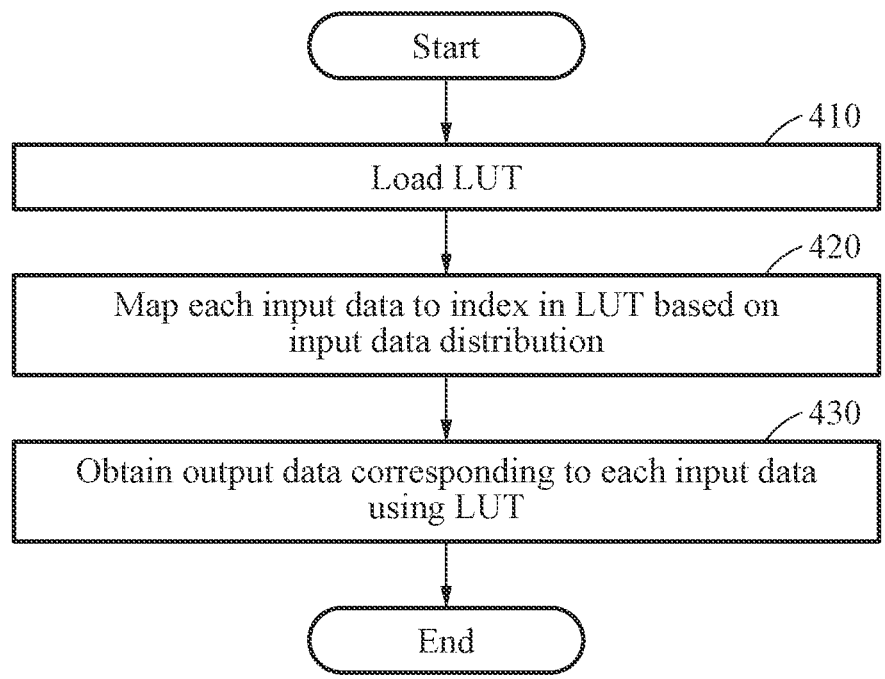
FIG. 4 illustrates a flowchart of an example of a softmax approximation method.

FIG. 4 illustrates a flowchart of an example of a softmax approximation method. Operations 410 through 430 to be described hereinafter with reference to FIG. 4 may be performed by a hardware accelerator, for example, the hardware accelerator 230 of FIG. 2. The hardware accelerator may be, or embodied by, one or more hardware modules, one or more software modules, or various combinations thereof.

In FIG. 4, in operation 410, the hardware accelerator loads a LUT. The hardware accelerator may load a LUT stored in a host, or a LUT generated in real time in the host. For example, an NPU may load a LUT generated in a CPU.

The LUT may store information associated with a reciprocal of an exponential function corresponding to a preset range. For example, the LUT may include information associated with values from 1/exp(0) to 1/exp(n), in which n denotes a positive integer. The LUT may indicate an approximate value of the reciprocal of the exponential function as indicated in Table 1 below.

TABLE 1

| Index (id) | LUT (id) |
|---|---|
| 0 | 1.000 |
| 1 | 0.368 |
| 2 | 0.135 |
| 3 | 0.050 |
| 4 | 0.018 |
| 5 | 0.007 |
| 6 | 0.002 |
| 7 | 0.001 |

In addition, the information associated with the reciprocal of the exponential function may include information associated with an integer corresponding to the reciprocal of the exponential function based on the number of bits for quantization of output data. For example, the output data may be quantized up to [0, 255] using 8 bits, and the LUT may include information associated with an integer proportional to the reciprocal of the exponential function within [0, 255], as indicated in Table 2 below.

TABLE 2

| Index (id) | LUT (id) |
|---|---|
| 0 | 255 |
| 1 | 94 |
| 2 | 35 |
| 3 | 13 |
| 4 | 5 |
| 5 | 2 |
| 6 | 1 |
| 7 | 0 |

Similarly, the output data may be quantized up to [0, 15] using 4 bits, and the LUT may include information associated with an integer proportional to the reciprocal of the exponential function within [0, 15], as indicated in Table 3 below.

TABLE 3

| Index (id) | LUT (id) |
|---|---|
| 0 | 15 |
| 1 | 6 |
| 2 | 2 |
| 3 | 1 |
| 4 | 0 |

In operation 420, the hardware accelerator maps each input data value to an index of the LUT based on an input data distribution. Here, input data may be data to be input to a softmax layer, for example, the computation result s described above with reference to FIG. 3. The hardware accelerator may calculate a difference between a maximum input data value and each input data value, and map each input data value to an index in the LUT based on the calculated difference.

In an example, the hardware accelerator may directly map the difference between maximum input data value and each input data value to the index in the LUT. For example, in a case in which input data is 990, 991, 992, 992, 990, 995, 993, and 997, the hardware accelerator may directly map, to an index in the LUT, a difference (e.g., 7, 6, 5, 5, 7, 2, 4, and 0) between a maximum input data value (e.g., 997) and each input data value, without processing.

In addition, the host may store a plurality of LUTs, and the hardware accelerator may load one of the LUTs, in a non-limiting example. The hardware accelerator may determine a LUT index range based on a greatest difference of differences calculated between the maximum input data value and each input data value, and load one of the LUTs based on the determined index range.

For example, in a case in which the LUTs indicated in Tables 2 and 3 above are stored in the host, and input data is 990, 991, 992, 992, 990, 995, 993, and 997, the hardware accelerator may determine an index range to be [0, 7] based on a greatest difference 7 of differences 7, 6, 5, 5, 7, 2, 4, and 0 between a maximum input data value 997 and each input data value, and then load, as a final LUT, the LUT of Table 3 corresponding to the determined index range. In this example, when loading one of the LUTs, the hardware accelerator may load the LUT after calculating a difference between a maximum input data value and each input data value.

In operation 430, the hardware accelerator obtains output data corresponding to each input data value using the LUT. The output data may be data output from the softmax layer, for example, a relative probability value indicating a probability that input data of a neural network is classified into each class, as described above with reference FIG. 3.

For example, in a case in which input data of the softmax layer is 990, 991, 992, 992, 990, 995, 993, and 997, the hardware accelerator may output, as output data corresponding to each input data value, LUT(7), LUT(6), LUT(5), LUT(5), LUT(7), LUT(2), LUT(4), and LUT(0). In the LUT of Table 1 above, the output data may be 0.001, 0.002, 0.007, 0.007, 0.001, 0.135, 0.018, and 1.0. In this example, the input data of the neural network may be classified into class 8.

Here, 2n cycles may suffice for the hardware accelerator to perform a softmax operation. For example, n cycles may be needed to obtain the maximum input data value, and n cycles may be needed to load the LUT and obtain the output data. Hereinafter, detailed examples of mapping each input data value to an index in an LUT based on an input data distribution will be described with reference to FIGS. 5 through 7.

Figure 5:
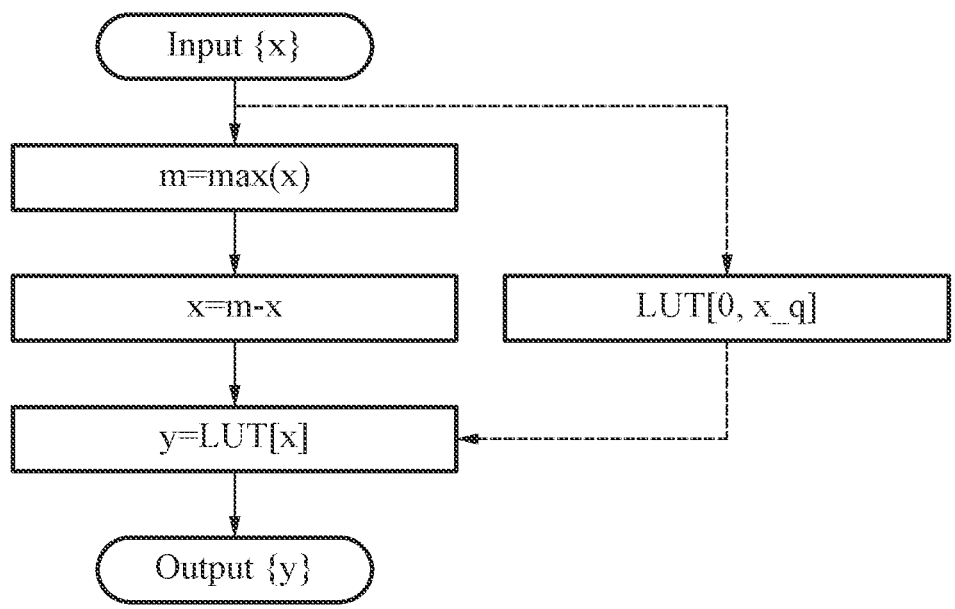
FIG. 5 illustrates a flowchart of an example of a method of mapping each input data value to an index in a lookup table (LUT) based on a difference between a maximum input data value and each input data value.

FIG. 5 illustrates a flowchart of an example of a method of mapping each input data value to an index in a LUT based on a difference between a maximum input data value and each input data value.

In FIG. 5, a hardware accelerator may load a LUT having an index range of [0, x_q] from a host, for example, a CPU.

The hardware accelerator may extract a maximum input data value and calculate a difference between the extracted maximum input data value and each input data value.

The hardware accelerator may directly map the difference between the maximum input data value and each input data value to an index in the LUT.

The hardware accelerator may obtain output data corresponding to each input data value using the LUT. As described above, the output data may indicate a relative probability value indicating a probability that input data of a neural network is classified into each class.

The hardware accelerator may directly map the difference between the maximum input data value and each input data value to an index in the LUT, and obtain the relative probability value indicating the probability that the input data of the neural network is classified into each class, without a divider.

Figure 6:
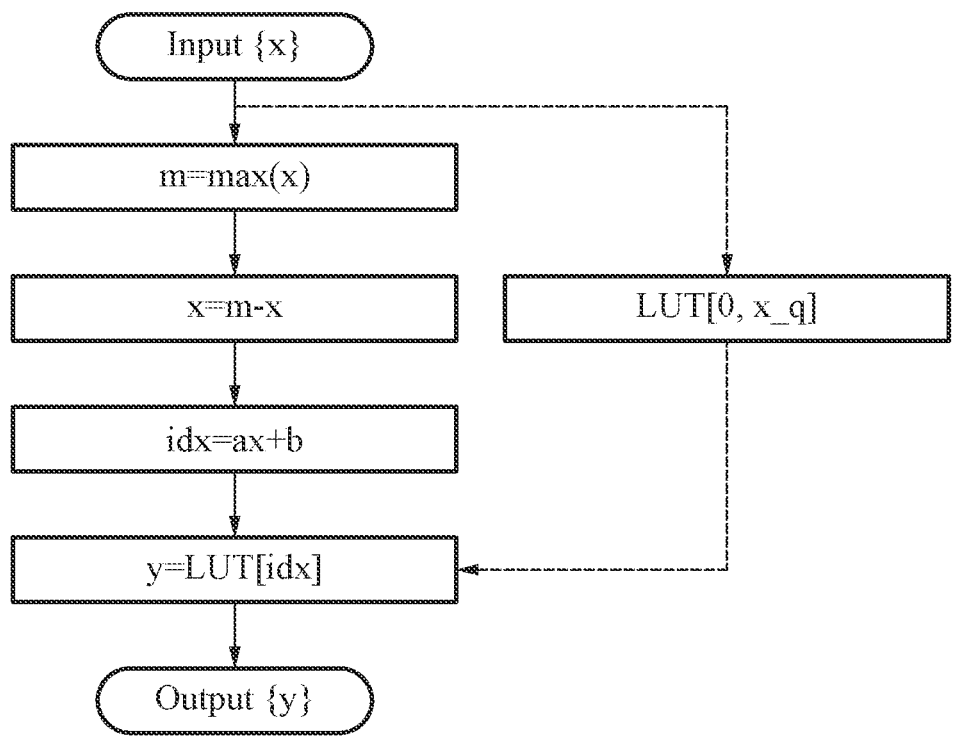
FIG. 6 illustrates a flowchart of an example of a method of scaling a difference between a maximum input data value and each input data value, and mapping the scaled difference to an index in a LUT.

FIG. 6 illustrates a flowchart of an example of a method of scaling a difference between a maximum input data value and each input data value and mapping the scaled difference to an index in a LUT.

In FIG. 6, a hardware accelerator may scale a difference between a maximum input data value and each input data value and map the scaled difference to an index in a LUT.

For example, in a case in which the difference between the maximum input data value and each input data value has a range of [0, 10] and an index of the loaded LUT has a range of [0, 20], scaling the difference to be suitable for the index range may be more effective to increase the accuracy of output data, compared to directly mapping the difference to the index.

The hardware accelerator may extract the maximum input data value and calculate the difference between the maximum input data value and each input data value.

The hardware accelerator may scale the difference between the maximum input data value and each input data value and map the scaled difference to the index. In the foregoing example, based on an equation idx=2x, the hardware accelerator may map the difference between the maximum input data value and each input data value to the index.

The hardware accelerator may obtain output data corresponding to each input data value using the LUT.

Figure 7:
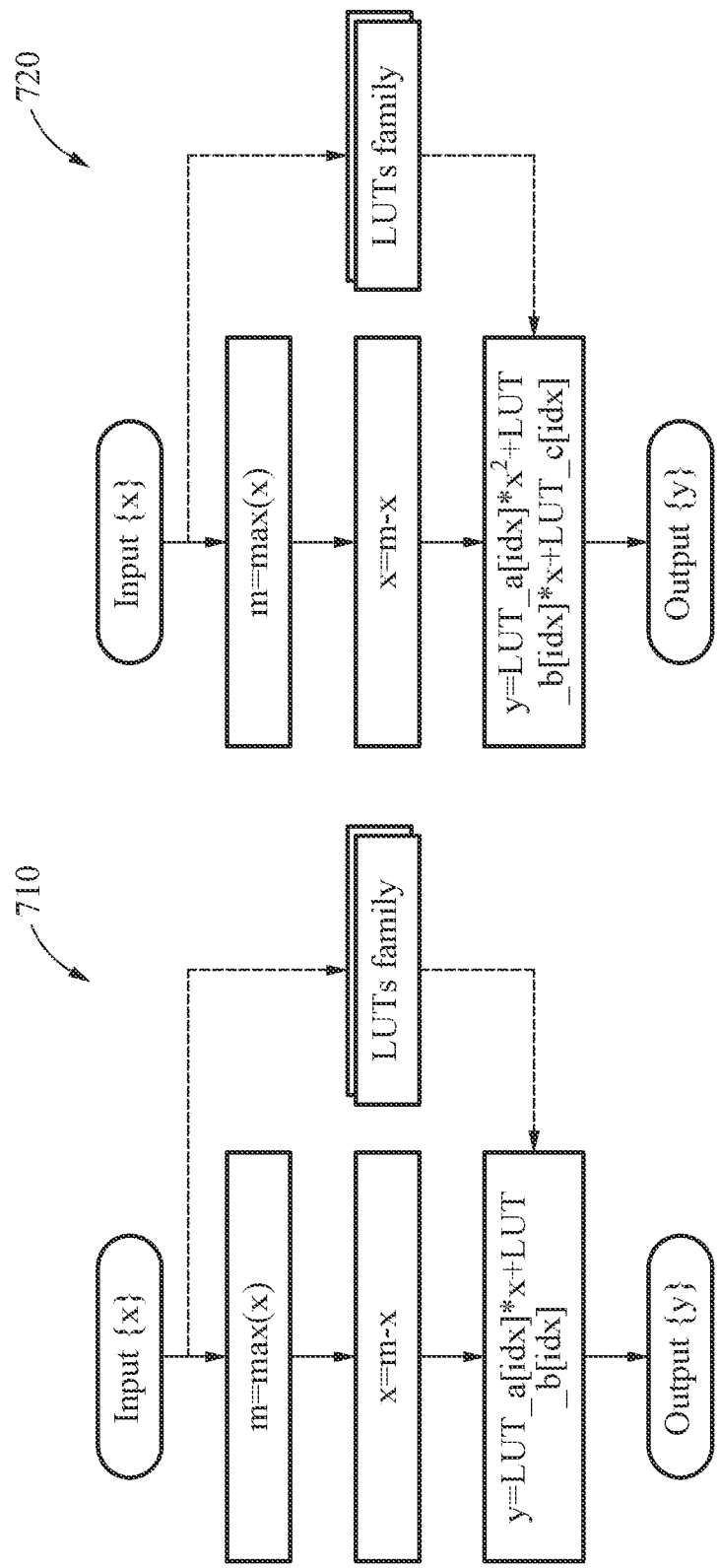
FIG. 7 illustrates a flowchart of an example of a method of obtaining output data through polynomial approximation using a plurality of LUTs.

FIG. 7 illustrates a flowchart of an example of a method of obtaining output data through polynomial approximation using a plurality of LUTs.

In FIG. 7, a hardware accelerator may obtain output data through polynomial approximation using a plurality of LUTs.

The hardware accelerator may flexibly control approximation accuracy according to a selected polynomial. For example, the hardware accelerator may flexibly control the approximation accuracy by selecting one from between a first-degree polynomial approximation method 710 and a second-degree polynomial approximation method 720 based on a situation.

Figure 8:
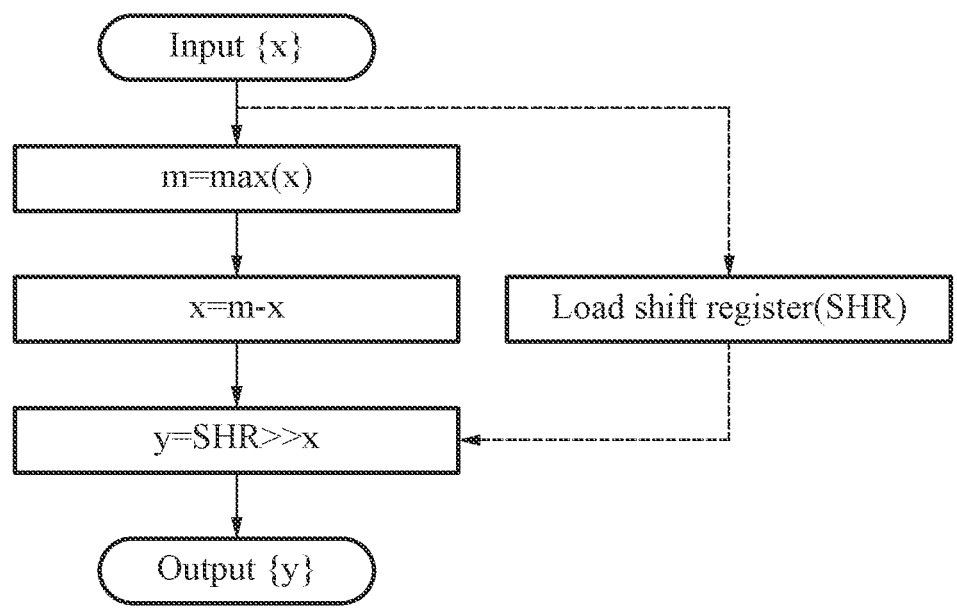
FIG. 8 illustrates a flowchart of an example of a method of obtaining output data using a shift register.

FIG. 8 illustrates a flowchart of an example of a method of obtaining output data using a shift register.

In FIG. 8, a hardware accelerator may map a clock of a shift register to an index, and obtain output data using the shift register.

The hardware accelerator may extract a maximum input data value and calculate a difference between the extracted maximum input data value and each input data value.

The hardware accelerator may map the clock of the shift register to the index based on the calculated difference between the maximum input data value and each input data value.

The hardware accelerator may obtain the output data corresponding to the clock corresponding to the difference between the maximum input data value and each input data value, using the shift register. For example, in a case of using a 4-bit shift register, the hardware accelerator may obtain an output indicated in Table 4 below.

TABLE 4

| Index (id) | LUT (id) |
|---|---|
| 0 | 15(1111$_{(2)}$) |
| 1 | 7(0111$_{(2)}$) |
| 2 | 3(0011$_{(2)}$) |
| 3 | 1(0001$_{(2)}$) |
| 4 | 0(0000$_{(2)}$) |

Figure 9:
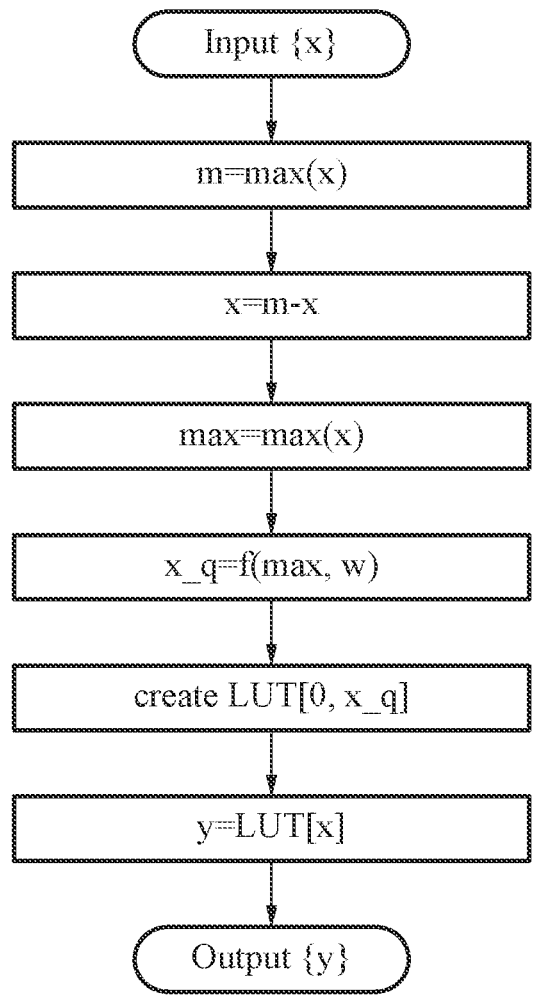
FIG. 9 illustrates a flowchart of an example of a method of generating a LUT.

FIG. 9 illustrates a flowchart of an example of a method of generating a LUT.

In FIG. 9, a host, for example, a CPU, may extract a maximum input data value, and calculate a difference between the extracted maximum input data value and each input data value. Alternatively, the host may receive the difference between the maximum input data value and each input data value from a hardware accelerator, for example, an NPU, without directly calculating the difference.

The host may extract a greatest difference of differences obtained by calculating the difference between the maximum input data value and each input data value. For example, in a case in which input data is 990, 991, 992, 992, 990, 995, 993, and 997, the host may determine a greatest difference to be 7 among the differences 7, 6, 5, 5, 7, 2, 4, and 0 between a maximum input data value 997 and respective input data values.

The host may generate a LUT based on the greatest difference and the number of bits for quantization of output data. In the foregoing example, the host may determine a LUT index range based on the greatest difference which is 7, and generate information associated with an integer proportional to a reciprocal of an exponential function corresponding to an index based on the number of bits for quantization of output data. For example, the host may generate the LUT indicated in Table 2 above based on the greatest difference which is 7 and the number of bits which is 8 bits.

Figure 10:
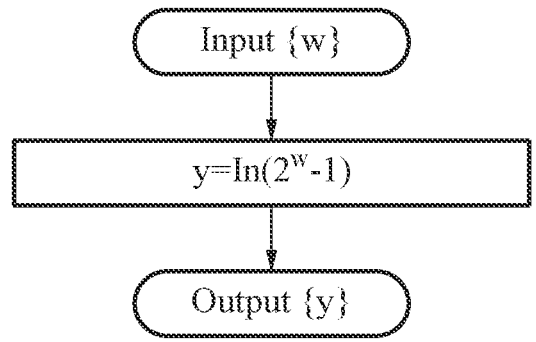
FIG. 10 illustrates a flowchart of an example of a method of determining an efficient quantization boundary.

FIG. 10 illustrates a flowchart of an example of a method of determining an efficient quantization boundary.

In FIG. 10, a hardware accelerator may determine an efficient quantization boundary as represented by Equation 6.

$$x\_q = ln(2^w - 1)$$ Equation 6

In Equation 6, w denotes the number of bits for quantization of output data. For example, in a case of using an int8 hardware accelerator, w may be determined to be 7. For example, in a case of using an int4 hardware accelerator, w may be determined to be 3. For example, in a case of using an uint4 hardware accelerator, w may be determined to be 4.

The hardware accelerator may determine the quantization boundary based on Equation 6 above, and effectively use an available quantization range based on the determined quantization boundary. That is, in such an example, a LUT may provide a higher level of accuracy with a same number of quantization bits. When the quantization boundary is determined based on Equation 6 above, contents of the LUT may need to be re-calculated based on x_q.

Figure 11:
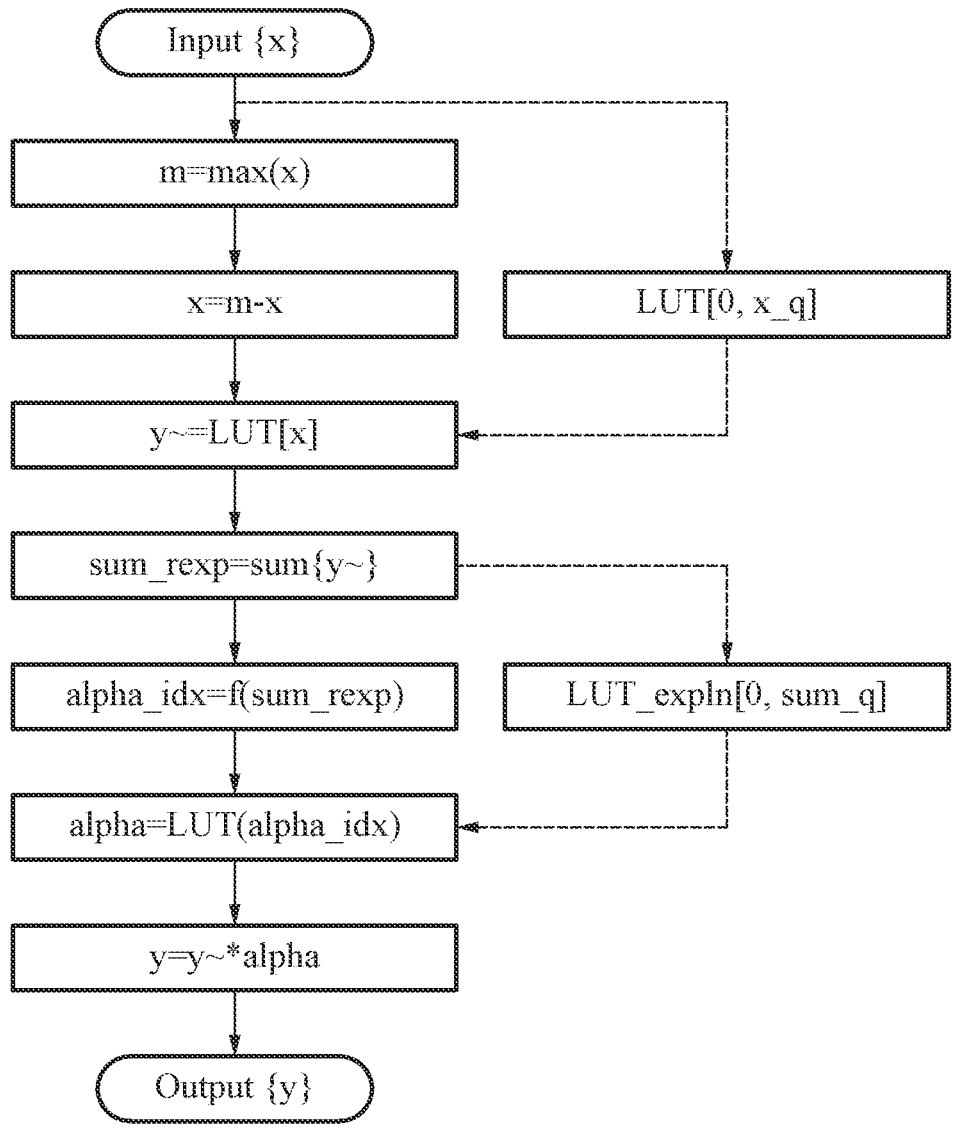
FIG. 11 illustrates a flowchart of an example of a method of obtaining normalized output data.

FIG. 11 illustrates a flowchart of an example of a method of obtaining normalized output data.

Operations of a hardware accelerator described above with reference to FIGS. 1 through 10 are applicable to the example of FIG. 11, and thus a more detailed and repeated description will be omitted here.

The hardware accelerator may estimate a softmax value through an approximation operation represented by Equation 5 above. However, in an example of performing a complex task, such as, for example, natural language processing, using an approximate softmax value in Equation 5, final accuracy in the task may be degraded to an extent that undermines the normal performance of the task due to an approximation error. The hardware accelerator may obtain normalized output data by applying a compensation coefficient α to the approximate softmax value. For example, the approximate softmax value may be a scaled version of an actual softmax value, and thus the hardware accelerator may obtain the normalized output data by distributing a scaled level to the approximate softmax value. The normalized output data may be obtained as represented by Equation 7.

$$y(x) = \alpha * y\tilde{\,}(x)$$ Equation 7

In Equation 7, y (x) denotes a softmax value estimated through Equation 5 above, a denotes a compensation coefficient, and y(x) denotes normalized output data. The compensation coefficient α may be calculated as represented by Equation 8.

$$\alpha = \frac{1}{\sum \tilde{y}}$$ Equation 8

The hardware accelerator may calculate a sum of approximate softmax values, and map the sum to an index of the compensation coefficient α. The hardware accelerator may map the sum of the approximate softmax values to the index of the compensation coefficient α using a preset function. For example, the hardware accelerator may map the sum of the approximate softmax values to the index of the compensation coefficient α as represented by Equation 9.

$$\text{alpha\_}idx = \text{round}(\text{sum\_}rexp)$$ Equation 9

Equation 9 is provided merely as an example of mapping the sum of the approximate softmax values to the index of the compensation coefficient α. The mapping may be performed using various functions, for example, alpha_idx=round(sum_rexp)−1, alpha_idx=ceil (sum_rexp)−1, alpha_idx=floor(sum_rexp), and the like, as non-limiting examples.

The hardware accelerator may obtain the compensation coefficient α corresponding to the index using a compensation coefficient LUT that includes information associated with the compensation coefficient α, and obtain normalized output data corresponding to input data by multiplying each of the approximate softmax values by the compensation coefficient α.

For example, a compensation coefficient LUT corresponding to 16 indices using 16 bits with a sign may be indicated in Table 5 below.

TABLE 5

| Index (id) | expln_LUT (id) |
|---|---|
| 0 | 32767 |
| 1 | 16384 |
| 2 | 10922 |
| 3 | 8192 |
| 4 | 6553 |
| 5 | 5461 |
| 6 | 4681 |
| 7 | 4096 |
| 8 | 3641 |
| 9 | 3277 |
| 10 | 2979 |
| 11 | 2731 |

TABLE 5-continued

| Index (id) | expln_LUT (id) |
|---|---|
| 12 | 2521 |
| 13 | 2341 |
| 14 | 2184 |
| 15 | 0 |

For example, a compensation coefficient LUT corresponding to 16 indices using 8 bits without a sign may be indicated in Table 6 below.

TABLE 6

| Index (id) | expln_LUT (id) |
|---|---|
| 0 | 255 |
| 1 | 128 |
| 2 | 85 |
| 3 | 64 |
| 4 | 51 |
| 5 | 43 |
| 6 | 36 |
| 7 | 32 |
| 8 | 28 |
| 9 | 26 |
| 10 | 23 |
| 11 | 21 |
| 12 | 20 |
| 13 | 18 |
| 14 | 17 |
| 15 | 0 |

For example, a compensation coefficient LUT corresponding to 16 indices using 4 bits with a sign may be indicated in Table 7 below.

TABLE 7

| Index (id) | expln_LUT (id) |
|---|---|
| 0 | 15 |
| 1 | 8 |
| 2 | 5 |
| 3 | 4 |
| 4 | 3 |
| 5 | 3 |
| 6 | 2 |
| 7 | 2 |
| 8 | 2 |
| 9 | 2 |
| 10 | 1 |
| 11 | 1 |
| 12 | 1 |
| 13 | 1 |
| 14 | 1 |
| 15 | 0 |

For example, a compensation coefficient LUT corresponding to 7 indices using 2 bits with a sign may be indicated in Table 8 below.

TABLE 8

| Index (id) | expln_LUT (id) |
|---|---|
| 0 | 3 |
| 1 | 2 |
| 2 | 1 |
| 3 | 1 |
| 4 | 1 |
| 5 | 1 |
| 6 | 0 |

Further, to increase accuracy, a scale of the compensation coefficient LUT may be adjusted. For example, in a case in which the compensation coefficient LUT is scaled to LUT_expln [0, scale*sum_q], an index of the compensation coefficient $\alpha$ may be determined based on alpha_idx=round (scale*sum_rexp)−1.

The neural network device, host, hardware accelerator, memory, neural network device 200, host 210, hardware accelerator 230, memory 220 and other devices, apparatuses, units, modules, and other components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD−Rs, CD+Rs, CD−RWs, CD+RWs, DVD-ROMs, DVD−Rs, DVD+Rs, DVD−RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of a hardware accelerator, comprising:
   loading a lookup table; and
   generating an output result of at least one layer of a neural network model by:
   generating input data values by respectively normalizing output values, from among the at least one layer of the neural network model, corresponding to input data being input to the at least one layer, resulting in all generated input data values having positive values, and
   generating output data values with respect to the output result by mapping each of the input data values to respective indexes of the lookup table based on differences between a maximum input data value of the input data values and each of the input data values, including mapping a sum of the output data values to indexes in a compensation coefficient lookup table, including
   obtaining compensation coefficients corresponding to the input data values using the compensation coefficient lookup table, and
   obtaining normalized output data values corresponding to the input data values based on the compensation coefficient,
   wherein the output data values are proportional to corresponding softmax values of the input data values.

2. The method of claim 1, wherein the normalizing includes respectively subtracting each of the output values from a determined value of the output values to generate the input data values.

3. The method of claim 2, wherein the mapping comprises:
   directly mapping the input data values to the indexes.

4. The method of claim 2, wherein the mapping comprises:
   scaling each result of the respective subtracting, to respectively generate the input data values.

5. The method of claim 2, wherein the lookup table comprises a plurality of lookup tables, and
   the method further comprises loading the lookup table, including:
   determining an index range based on a greatest difference of differences obtained through the normalizing; and
   loading one of the lookup tables based on the determined index range.

6. The method of claim 2, further comprising loading the lookup table, including:
   determining an index range based on a maximum input data value of the input data values and
   loading the lookup table generated in real time based on the determined index range.

7. The method of claim 1, wherein the lookup table stores therein information associated with a reciprocal of an exponential function corresponding to the indexes.

8. The method of claim 7, wherein the information associated with the reciprocal of the exponential function includes information associated with an integer corresponding to the reciprocal of the exponential function based on a number of bits for quantization of the output data values.

9. The method of claim 1, wherein the generating of the output data values comprises:
mapping a clock of a shift register to the indexes; and
generating the output data values using the shift register.

10. The method of claim 1, wherein the hardware accelerator is a neural processing unit (NPU).

11. The method of claim 1, wherein a central processing unit (CPU) is configured to generate the lookup table.

12. A non-transitory computer-readable storage medium storing instructions that, when executed by one or more processors, configure the one or more processors to perform the method of claim 1.

13. A hardware accelerator, comprising:
one or more hardware processors configured to perform an output operation of a neural network model, including performance of a mapping each of input data values to an index of indexes in a lookup table based on differences between a maximum input data value of the input data values and each of the input data values, including converting each of the input data value to a respective positive value, obtaining output data values corresponding to the input data values using the lookup table, and mapping a sum of the output data values to indexes in a compensation coefficient lookup table, wherein the output data values are proportional to corresponding softmax values of the input data values, and
wherein the one or more processors are configured to:
obtain compensation coefficients corresponding to the input data values using the compensation coefficient lookup table, and
obtain normalized output data values corresponding to the input data values based on the compensation coefficient.

14. The hardware accelerator of claim 13, wherein the one or more processors are configured to:
calculate the differences between the maximum input data value of the input data and each of the input data values by subtracting each of the input data values from the maximum input data value.

15. The hardware accelerator of claim 14, wherein the one or more processors are configured to:
directly map the differences to the indexes in the lookup table.

16. The hardware accelerator of claim 14, wherein the one or more processors are configured to:
scale the differences and map the scaled differences to the indexes in the lookup table.

17. The hardware accelerator of claim 14, wherein the lookup table comprises a plurality of lookup tables,
wherein the one or more processors are configured to:
determine an index range based on a greatest difference of differences obtained through the calculating; and
load one of the lookup tables based on the determined index range.

18. The hardware accelerator of claim 14, wherein the one or more processors are configured to:
determine an index range based on a greatest difference of differences obtained through the calculating; and
load the lookup table generated in real time based on the determined index range.

19. The hardware accelerator of claim 13, wherein the lookup table stores therein information associated with a reciprocal of an exponential function corresponding to the indexes in the lookup table.

20. The hardware accelerator of claim 19, wherein the information associated with the reciprocal of the exponential function includes information associated with an integer corresponding to the reciprocal of the exponential function based on a number of bits for quantization of the output data values.

21. The hardware accelerator of claim 13, wherein the one or more processors are configured to:
map a clock of a shift register to the indexes in the lookup table; and
obtain the output data values using the shift register.

22. The hardware accelerator of claim 13, wherein the hardware accelerator is a neural processing unit (NPU).

23. The hardware accelerator of claim 13, wherein, for the performing the output operation of the neural network model, the one or more processors are configured to generate an output operation result of the neural network model, including:
normalizing each of plural output values of at least one layer of the neural network model,
mapping a sum of the plural output values to indexes in a reciprocal exponential-based lookup table, and
generating the output operation result by generating approximated softmax data values respectively corresponding to the output values using the reciprocal exponential-based lookup table.

24. A neural network device, comprising:
a central processing unit (CPU) configured to generate a lookup table in which information associated with a reciprocal of an exponential function is stored; and
a neural processing unit (NPU) configured to generate an output result of at least one layer of a neural network model, by using the lookup table to obtain output data values corresponding to input data values, including mapping each of the input data values to respective indexes of the lookup table based on differences between a maximum input data value of the input data values and each of the input data values and mapping a sum of the output data values to indexes in a compensation coefficient lookup table, obtaining compensation coefficients corresponding to the input data values using the compensation coefficient lookup table and obtaining normalized output data values corresponding to the input data values based on the compensation coefficient,
wherein the output data values are proportional to corresponding softmax values of the input data values.

25. The device of claim 24, wherein the NPU is a hardware accelerator.

26. The device of claim 24, wherein the CPU is further configured to generate the neural network model, for classification of training the input data values.

27. The device of claim 26, wherein the NPU is further configured to generate intermediate values, as the input data values, input to the at least one layer of the neural network model, and approximate softmax data values respectively corresponding to the intermediate values using the lookup table to obtain the output data values.

28. The device of claim 24, wherein the neural network for classification comprises a loss layer configured to compute a loss as an objective function for learning.

29. The device of claim 24, wherein the NPU is further configured to scale the differences between the maximum input data value of the input data values and each of the input data values, and map the scaled differences to indexes of the lookup table.

30. The device of claim 24, wherein the obtainment of the output data values includes conversions of the input data value to all be positive values.

31. The device of claim 24, wherein the obtaining of the output data values includes respective normalizations of the input data values by subtracting each of the input data values from a determined input data value.

32. The device of claim 31, wherein the determined input data value is a determined maximum value among the input data values.

* * * * *